Jan. 29, 1924.  1,481,863
L. R. FREW
CINEMATOGRAPH SPOOL AND SPOOL BOX
Filed July 27, 1921
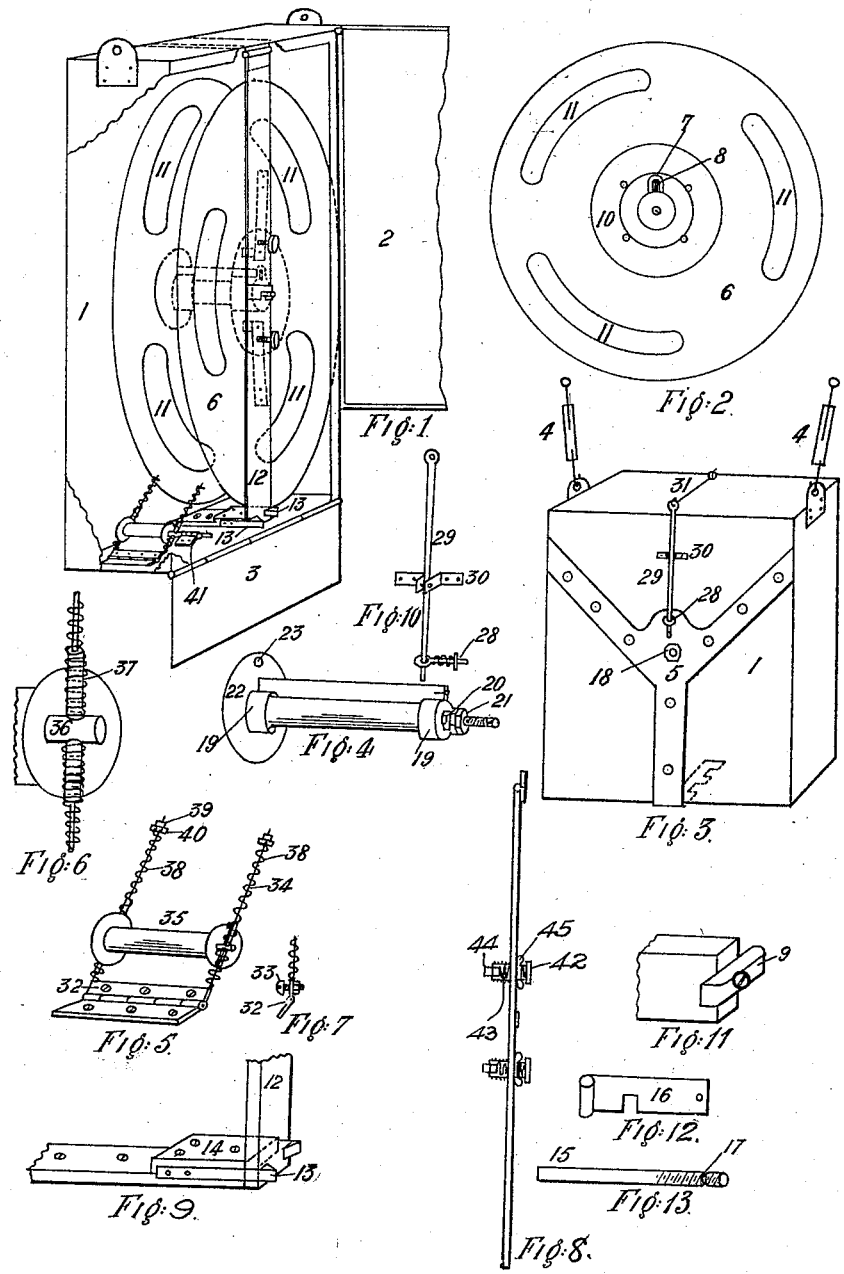

Patented Jan. 29, 1924.

1,481,863

UNITED STATES PATENT OFFICE.

LANCELOT RUSSELL FREW, OF EAST BRISBANE, QUEENSLAND, AUSTRALIA.

CINEMATOGRAPH SPOOL AND SPOOL BOX.

Application filed July 27, 1921. Serial No. 487,953.

*To all whom it may concern:*

Be it known that LANCELOT RUSSELL FREW, a subject of the King of the United Kingdom of Great Britain and Ireland, residing at East Brisbane, in the State of Queensland, Commonwealth of Australia, has invented new and useful Improvements in Cinematograph Spools and Spool Boxes, of which the following is a specification.

This invention relates to cinematograph spools and spool boxes; in spool boxes at present in use the spool spindles are supported at one end only whereby there is a tendency for the spindle carrying the spool to deflect and vibrate (especially when loaded with a long length of film) with the result that a perfectly clear definition of the pictures is not reflected upon the screen, the films also through the spool not running true are subject to damage and in using large spools loaded with long films a jerking movement often occurs when operating and the film is being unwound, with great risk of breaking the film: the object of this invention is to ensure absolute rigidity, avoid any vibration of the spool spindle, to eliminate the risk of damaging or breaking the films and to project upon the screen a continuous picture without changing spools.

The invention consists in a ball bearing hub revolving upon a spindle supported at one end in the side of the box and at the other end in a vertical flat bar hinged to the top of the box and fastened to the bottom of the box by a spring catch.

The side of the box is closed by a door hinged to the side or top and overlapping a small flap door hinged to the bottom, these doors are fastened by any suitable means.

Fastened to the hub is a flat metal bar which fits into a slot in the hub of the spool by which means the spool is fastened to the hub, a button on the end of the bar preventing any lateral movement.

To the vertical supporting bar are fitted two tubular set screws provided with spiral springs and wing nuts and round brake leathers.

To one side and to the bottom of the box on the outside is riveted a branched stiffening plate which is fastened to the biograph machine by a bolt and nut, the horizontally disposed end of the plate being furnished with slots for regulating the distance of the spool box from the biograph machine.

To further guard against vibration and to relieve the weight of the box from the biograph machine, the box is supported from the roof of the biograph machine cabinet by adjusting suspension screws.

On to the bottom of the box is fastened a hinged tension device for preventing the jerking movement of the film during its unwinding from the spool.

To fully describe the invention, reference is now made to the drawings in which:—

Fig. 1, is a perspective view of the spool box with end removed, showing the spool mounted therein and the necessary fixtures for same.

Fig. 2 is a side elevation of spool to reduced scale.

Fig. 3 is a perspective view of spool box closed to reduced scale.

Fig. 4 is a perspective view to enlarged scale of revolving hub for spool.

Fig. 5 is a perspective view to enlarged scale of the tension device.

Fig. 6 is a perspective view to enlarged scale of end of tension device roller.

Fig. 7 is a side view to enlarged scale of part of the tension device.

Fig. 8 is a side elevation of brake mechanism.

Figs. 9 to 13 are details of construction.

The reference numerals indicate like parts in all figures.

1 is the spool box, 2 the side door hinged to the box, 3 the flap door hinged to the bottom of the box, the side door when closed overlaps the flap door, these doors are fastened by buttons or any other suitable means.

4 are adjusting screws hooked on to the spool box for suspending the same from the roof of the biograph machine cabinet thus relieving the weight from the biograph machine.

5 is a branched stiffening plate riveted onto one side and the bottom of the spool box, the bent end slotted as shown in dotted lines Fig. 3 and extended beyond the side of the spool box for fastening by bolt and nut to the biograph machine.

6 is an iron spool, the hub of which is of wood and is provided with a slot 7 to fit over a flat bar 8 fitted to the cone bearing hub when spool is fitted it is locked by a button 9.

10 is a flat metal ring screwed on to the side of the spool acting as the bearing surface for the brakes, 11 are openings in the metal sides of the spool.

12 is a vertical flat metal bar hinged to the top of the spool box fastened at the bottom by spring catches 13, 14 is a stop block riveted to the bottom of the box, there is a hole in the centre of the vertical bar for supporting one end of the cone spindle 15 which is locked to the vertical bar by a slotted catch 16 fitting into a circular groove 17 on the cone spindle, the other end of the cone spindle is supported by the branched stiffening plate 5 locked by a nut 18.

19 in Fig. 4 are ball races, 20 cone, 21 lock nut and 22 flange on cone bearing hub provided with a small hole 23 to receive the end of a spring trigger hereinafter referred to.

28 is a spring trigger which engages with the hole 23 in the flange 22 and prevents the cone bearing hub from revolving when fixing or removing the spool, this trigger is released by a rod 29 pivoted to a bracket 30 fitted on to the side of the spool box and by wire rod 31 which is hooked on to a pin on the top of the box.

32 is the hinge of the tension device provided with adjusting set screws 33 to regulate the inclination of the threaded wire rods 34 fastened to the hinge. 35 is a roller revolving on a spindle 36, into which are fitted metal tubes 37; spiral tension springs 38 encircle the wire rods 34 and the metal tubes 37 (see Fig. 6) secured to the wire rods by lock nuts 39 and tension nut 40. As the film passes over and under the roller 35 the springs prevent any jerking movement and the metal tubes 37 keep the roller in true alignment on the wire rods 34. 41 roller fixed in a slot in the bottom of the box through which the film as unwound from the spool is discharged from the spool box.

The film passes over and under the roller 35 and over the roller 41 and thence through the opening of the spool box.

In the brake mechanism 42 is a tubular set screw, 43 spiral spring, 44 brake leather and 45 lock nut.

What I do claim as my invention, and desire to secure by Letters Patent is:—

1. Improvements in cinematograph apparatus, comprising, in combination, a spool box provided with hinged flap doors, a vertical metal bar hinged to the top of said spool box, a spool, a revolving hub on which said spool is disposed, and means for supporting said spool at both ends thereof, one end of the spindle for holding the spool being supported by one side of the spool box and the other end by the vertical metal bar hinged to the top of the spool box, permitting the door of same to swing freely.

2. Improvements in cinematograph apparatus, comprising, in combination, a spool box provided with hinged flap doors, a vertical metal bar hinged to the top of said spool box, a spool, a revolving hub on which said spool is disposed, means for supporting said spool at both ends thereof, and an adjustable spring tension adapted to engage with one side of the spool, one end of the spindle for holding the spool being supported by one side of the spool box and the other end by the vertical metal bar hinged to the top of the spool box, permitting the door of same to swing freely.

3. Improvements in cinematograph apparatus, comprising, in combination, a spool box provided with hinged flap doors, a vertical metal bar hinged to the top of said spool box, a spool, a revolving hub on which said spool is disposed, means for supporting said spool at both ends thereof, and an adjustable spring tension adapted to engage with one side of the spool, one end of the spindle for holding the spool being supported by one side of the spool box and the other end by the vertical metal bar hinged to the top of the spool box, permitting the door of same to swing freely.

4. Improvements in cinematograph apparatus, comprising, in combination, a spool box provided with hinged flap doors, a vertical metal bar hinged to the top of said spool box, a spool, a revolving hub on which said spool is disposed, means for supporting said spool at both ends thereof, and an adjustable spring tension adapted to engage one side of the spool, one end of the spindle for holding the spool being supported by one side of the spool box and the other end by the vertical metal bar hinged to the top of the spool box, permitting the door of same to swing freely.

In testimony whereof he has signed his name to this specification.

LANCELOT RUSSELL FREW.